(12) United States Patent
Deng (10) Patent No.: US 9,559,542 B2
(45) Date of Patent: Jan. 31, 2017

(54) BATTERY POWERED CIRCUIT AND METHOD

(71) Applicant: Silergy Semiconductor Technology (Hangzhou) LTD, Hangzhou, ZheJiang Province (CN)

(72) Inventor: Fuhua Deng, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 115 days.

(21) Appl. No.: 14/678,530

(22) Filed: Apr. 3, 2015

(65) Prior Publication Data

US 2015/0357858 A1 Dec. 10, 2015

(30) Foreign Application Priority Data

Jun. 4, 2014 (CN) .......................... 2014 1 0254776

(51) Int. Cl.
*H02J 7/00* (2006.01)
*H02J 7/04* (2006.01)
*H02M 3/158* (2006.01)

(52) U.S. Cl.
CPC .............. *H02J 7/0081* (2013.01); *H02J 7/008* (2013.01); *H02J 7/0065* (2013.01); *H02J 7/0093* (2013.01); *H02M 3/158* (2013.01)

(58) Field of Classification Search
CPC ................. H02J 7/007; H02J 7/0052

USPC ................. 320/107, 137, 140, 148
See application file for complete search history.

(56) References Cited

U.S. PATENT DOCUMENTS

| | | | | |
|---|---|---|---|---|
| 7,615,965 B2* | 11/2009 | Popescu-Stanesti | ...... | H02J 1/08 307/46 |
| 8,378,633 B2* | 2/2013 | Bartling | .................. | H02M 1/15 320/128 |
| 8,450,979 B2 | 5/2013 | Kerr et al. | | |
| 9,362,833 B2* | 6/2016 | Xu | ..................... | H02M 3/33523 |
| 2008/0231233 A1 | 9/2008 | Thornton | | |
| 2013/0093381 A1* | 4/2013 | Mcginley | .............. | H02J 7/0068 320/107 |
| 2014/0152239 A1 | 6/2014 | Yao et al. | | |
| 2014/0203763 A1 | 7/2014 | Zhao et al. | | |
| 2015/0069956 A1* | 3/2015 | Hu | ........................ | H02J 7/0052 320/107 |

\* cited by examiner

*Primary Examiner* — M'Baye Diao
(74) *Attorney, Agent, or Firm* — Michael C. Stephens, Jr.

(57) ABSTRACT

In one embodiment, an apparatus can include: (i) a power converter having an output terminal configured to supply power for a load; (ii) a first switch coupled between the power converter and an input voltage; (iii) a second switch coupled between a battery and the output terminal of the power converter; (iv) a PWM controller configured to control a switching state of a power transistor in the power converter; (v) a mode-switching circuit configured to select a charging mode or a discharging mode based on a voltage of the battery and a charging current; and (vi) a charging-discharging circuit configured to control the second switch based on the mode selection.

12 Claims, 6 Drawing Sheets

BATTERY POWERED CIRCUIT AND METHOD

RELATED APPLICATIONS

This application claims the benefit of Chinese Patent Application No. 201410254776.6, filed on Jun. 4, 2014, which is incorporated herein by reference in its entirety.

FIELD OF THE INVENTION

The present invention generally relates to the field of power electronics, and more specifically to a battery powered circuit and an associated method.

BACKGROUND

Battery powered circuits are widely applied in various electronic products, such as smart phones, tablets, and laptop computers. In a laptop computer example, an adaptor may be used to power a computer system and a battery. The battery can directly supply power to the computer system when the external power supply is off-line (disconnected). Also, a power converter can be situated between the adapter and the computer system and battery for power conversion.

SUMMARY

In one embodiment, an apparatus can include: (i) a power converter having an output terminal configured to supply power for a load; (ii) a first switch coupled between the power converter and an input voltage; (iii) a second switch coupled between a battery and the output terminal of the power converter; (iv) a PWM controller configured to control a switching state of a power transistor in the power converter; (v) a mode-switching circuit configured to select a charging mode or a discharging mode based on a voltage of the battery and a charging current; and (vi) a charging-discharging circuit configured to control the second switch based on the mode selection.

In one embodiment, a method can include: (i) controlling, by a PWM controller, a switching state of a power transistor in a power converter, where the power converter comprises an output terminal configured to supply power for a load, a first switch is coupled between the power converter and an input voltage, and a second switch is coupled between a battery and the output terminal of the power converter; (ii) selecting, by a mode-switching circuit, a charging mode or a discharging mode based on a voltage of the battery and a charging current; and (iii) controlling, by a charging-discharging circuit, the second switch based on the mode selection.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Various switches can be used in battery powered circuits in order to control the power flow from the power converter or battery to the system power. For example, a first switch can be situated between the adapter and the power converter, and may be on when the adapter supplies power normally. The first switch can be off when the power supply is off-line (or insufficient), or when the input current is too large. A second switch can be situated between the power converter and the battery. The first and second switches may be used to control the power path between the input power supply, the load, and the battery. Power conversion for the load and the battery can be achieved in accordance with the input current and the charging current. For example, the second switch may be on for charging the battery. However, if the battery voltage is very low and the second switch is on, the load may operate under a minimum voltage. This can result in abnormal operation, and may possibly cause component damage.

In particular embodiments, a battery powered circuit can include a first switch, a power converter, and a second switch. The first switch can be coupled between an AC input and a power converter, and an output terminal of the power converter may be used as a power supply terminal for a load. The second switch can be coupled between the output terminal of the power converter and the battery. The power supply circuit may also include a power path controller and a PWM controller. For example, the PWM controller can be used to control (e.g., turn on/off) a power switch in the power converter. The power path controller can include a mode-switching circuit and a charging-discharging circuit. For example, the mode-switching circuit can control changing from a charging mode (or a discharging mode) to a discharging mode (or a charging mode). This mode control can be done according to the battery voltage and the charging current, and the charging-discharging control circuit can accordingly control the second switch.

In one embodiment, an apparatus can include: (i) a power converter having an output terminal configured to supply power for a load; (ii) a first switch coupled between the power converter and an input voltage; (iii) a second switch coupled between a battery and the output terminal of the power converter; (iv) a PWM controller configured to control a switching state of a power transistor in the power converter; (v) a mode-switching circuit configured to select a charging mode or a discharging mode based on a voltage of the battery and a charging current; and (vi) a charging-discharging circuit configured to control the second switch based on the mode selection.

In one embodiment, a method can include: (i) controlling, by a PWM controller, a switching state of a power transistor in a power converter, where the power converter comprises an output terminal configured to supply power for a load, a first switch is coupled between the power converter and an input voltage, and a second switch is coupled between a battery and the output terminal of the power converter; (ii) selecting, by a mode-switching circuit, a charging mode or a discharging mode based on a voltage of the battery and a charging current; and (iii) controlling, by a charging-discharging circuit, the second switch based on the mode selection.

Figure 1:
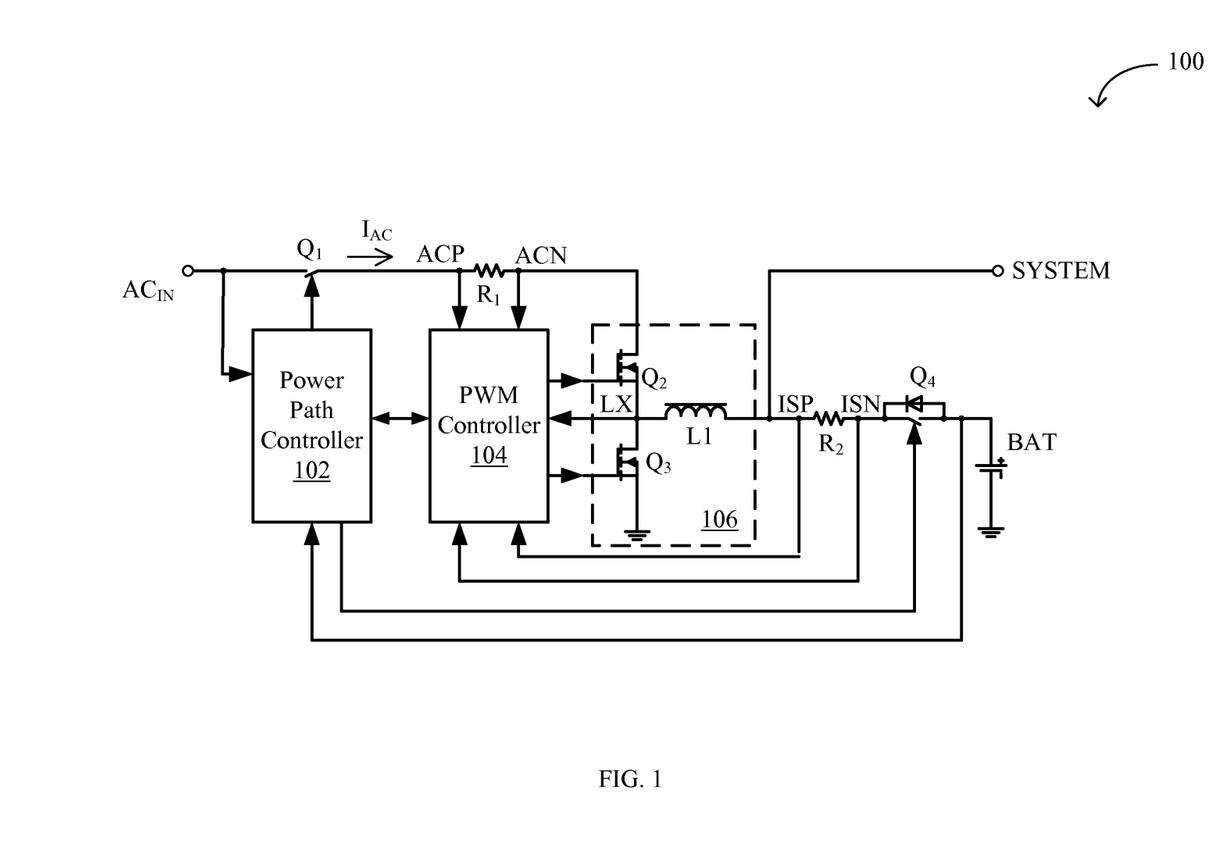
FIG. 1 is a schematic block diagram of an example battery powered circuit, in accordance with the present invention.

Referring now to FIG. 1, shown is a schematic block diagram 100 of an example battery powered circuit, in accordance with the present invention. In this example, power converter 106 can be a buck converter, and may include main power transistor $Q_2$ and synchronous transistor $Q_3$. Of course, other converter topologies (e.g., boost, SEPIC, flyback, etc.) can also be supported in particular embodiments. $AC_{IN}$ may be a power input terminal of an adapter, "SYSTEM" can be a terminal coupled to a load, and "BAT" can be a battery.

Power path controller 102 can be used to control switches $Q_1$ and $Q_4$. A voltage across sampling resistor $R_1$ may be used to generate a signal that represents input current $I_{AC}$. Also, a voltage across sampling resistor $R_2$ can be used to obtain a charging current and a battery voltage. PWM controller 104 can control operation of transistors $Q_2$ and $Q_3$ in power converter 106. For example, main power transistor $Q_1$ can be on when a voltage at input terminal $AC_{IN}$ is normally received (or on-line), and main power transistor $Q_1$ can be off when the voltage at input terminal $AC_{IN}$ is insufficient (or off-line), or input current $I_{AC}$ is relatively high.

When the adapter is determined to be disconnected (or off-line) according to the voltage at input terminal $AC_{IN}$, the load may be powered by the battery by turning on switch $Q_4$. When the input voltage is normally received, and the battery voltage is higher than preset minimum system voltage $V_{SYS\_MIN}$ (e.g., the lowest operating voltage for the load), the battery can be charged by turning on switch $Q_4$. When the battery voltage is less than the minimum system voltage, switch $Q_4$ may be partially turned on, and the system can operate in a pre-charging mode to charge the battery. During the pre-charging mode, the battery can be linearly charged with limited current, and switch (e.g., transistor) $Q_4$ may operate in the saturation region.

Figure 2:
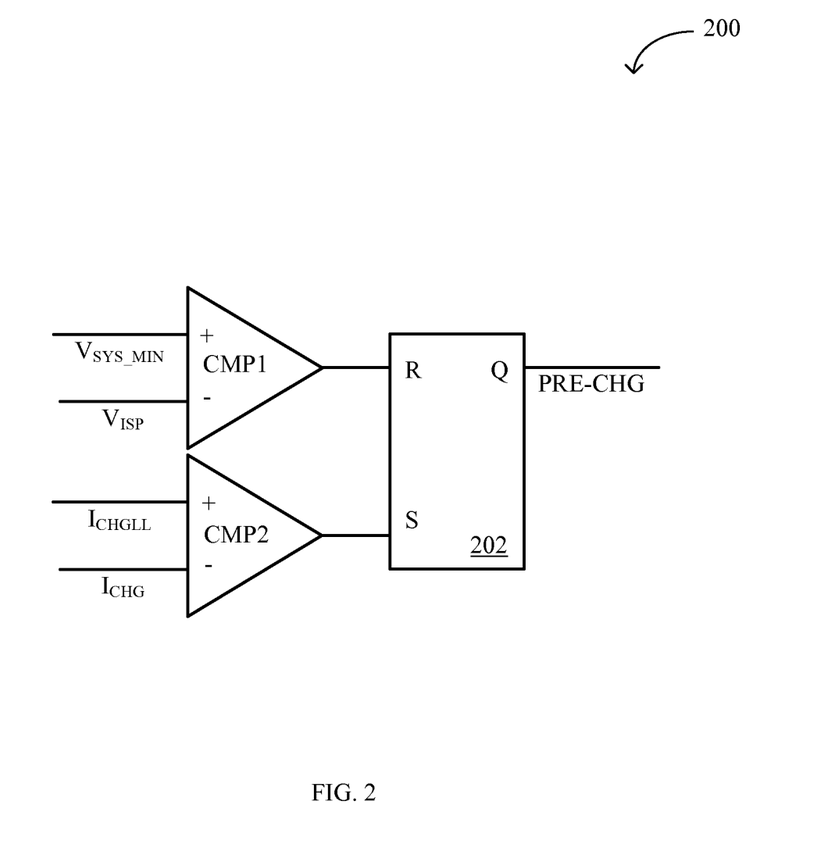
FIG. 2 is a schematic block diagram of an example mode-switching circuit, in accordance with the present invention.

Referring now to FIG. 2, shown is a schematic block diagram of an example mode-switching circuit 200, in accordance with the present invention. Mode switching circuit 200 can be part of power path controller 102. In mode switching circuit 200, comparator CMP1 can compare voltage $V_{ISP}$ (e.g., a voltage at node ISP) against minimum system voltage $V_{SYS\_MIN}$. For example, voltage $V_{ISP}$ can represent the battery voltage, and the minimum system voltage can be set as the lowest operating voltage for the load. When switch $Q_4$ is fully on, the battery voltage can be substantially equivalent to the voltage at system terminal SYSTEM, without consideration of the voltage drop on sampling resistor $R_2$ and switch $Q_4$. If voltage $V_{ISP}$ is higher than minimum system voltage $V_{SYS\_MIN}$, the system may operate under minimum system voltage $V_{SYS\_MIN}$ regardless of the conduction state of switch $Q_4$. In this case, flip-flop 202 may generate mode-switching signal PRE-CHG to turn on switch $Q_4$ by the charging-discharging circuit (see, e.g., FIG. 3).

Mode-switching signal PRE-CHG can be inverted to be the driving signal for switch $Q_4$, and the system can be in a constant current charging mode. If voltage $V_{ISP}$ is less than minimum system voltage $V_{SYS\_MIN}$, the system may operate under minimum system voltage $V_{SYS\_MIN}$ due to the conduction state of switch $Q_4$. Mode-switching signal PRE-CHG can be used to partially turn on switch $Q_4$ by charging-discharging circuit 300, so the battery can be charged with a limited current in order to prevent the load voltage from being pulled down, and the system may be in the pre-charging mode. As shown in FIG. 2, in the pre-charging mode, minimum charging current $I_{CHGLL}$ (e.g., about 1 mA) can be compared via comparator CMP2 against charging current $I_{CHG}$. When $I_{CHG}$ is less than $I_{CHGLL}$, the system may exit pre-charging mode, and enter the constant current charging mode. Thus, mode-switching signal can be generated by flip-flop 202 in accordance with the comparison result.

Figure 3:
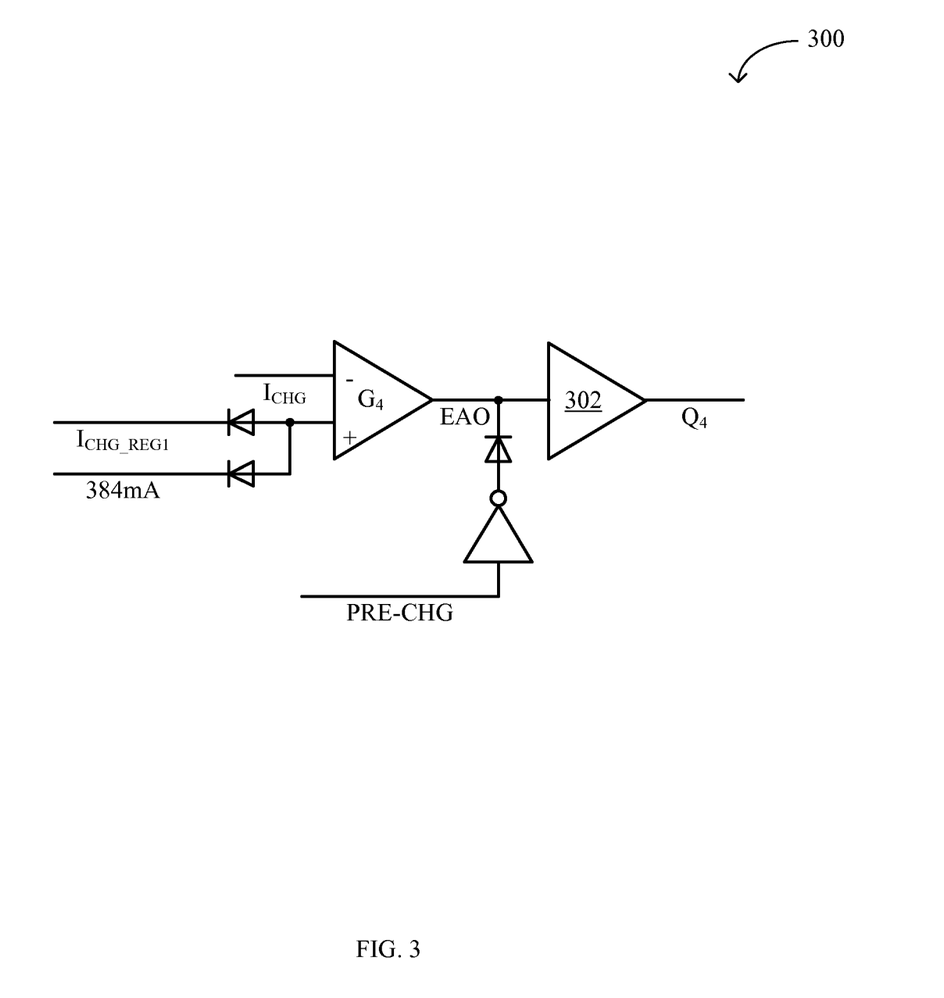
FIG. 3 is a schematic block diagram of an example charging-discharging circuit, in accordance with the present invention.

Referring now to FIG. 3, shown is a schematic block diagram of an example charging-discharging circuit 300, in accordance with the present invention. Charging-discharging circuit 300 can be part of power path controller 102. Charging-discharging circuit 300 can receive mode-switching signal PRE-CHG. During the pre-charging mode, mode-switching signal PRE-CHG can be high, and charging current $I_{CHG}$ and pre-charging current $I_{CHG\_REG1}$ can be compared and amplified by amplifier $G_4$. Error signal EAO can be generated to partially turn on switch $Q_4$, so as to charge the battery with limited current. While in the constant current charging mode, mode-switching signal PRE-CHG can be low, and switch $Q_4$ may be fully turned on to realize constant current charging. In this example, the larger of error signal EAO and the inverted version of mode-switching signal PRE-CHG can be selected as the driving signal (e.g., via driver 302) for switch $Q_4$. For example, the selection can be made by one or more diodes coupled at the output terminal of amplifier $G_4$, as shown in FIG. 3.

An upper limit threshold may be set for pre-charging current $I_{CHG\_REG1}$ to protect switch $Q_4$. In FIG. 3, the upper limit threshold can be about 384 mA, but any suitable value can be employed for this purpose. In this particular example, the lower of pre-charging current $I_{CHG\_REG1}$ and upper limit threshold 384 mA can be provided to amplifier $G_4$. When pre-charging current $I_{CHG\_REG1}$ is less than the upper limit threshold, pre-charging current $I_{CHG\_REG1}$ can be input to amplifier $G_4$, while when pre-charging current $I_{CHG\_REG1}$ is greater than the upper limit threshold, the upper limit threshold of 384 mA can be input to amplifier $G_4$.

Figure 4:
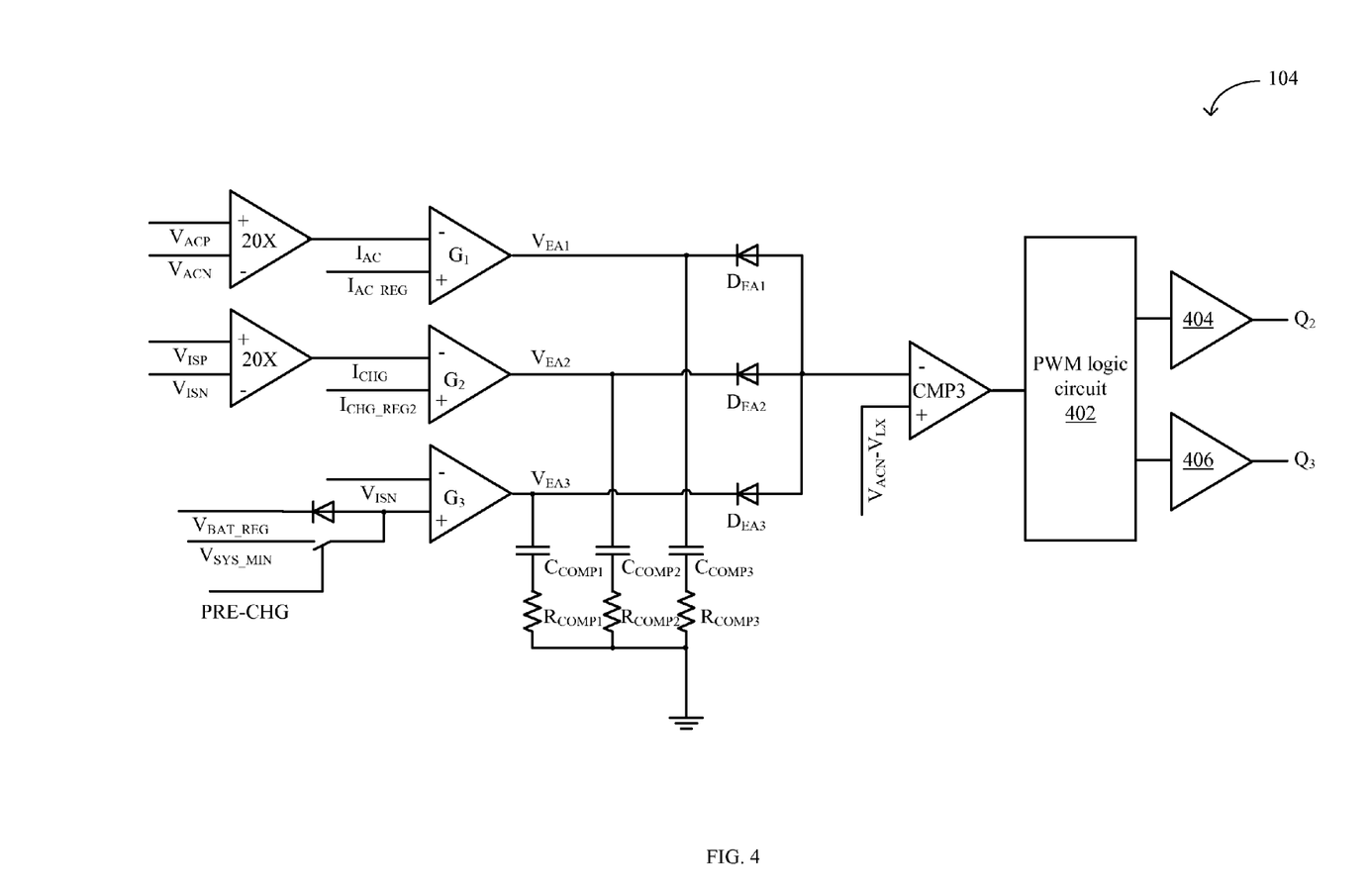
FIG. 4 is a schematic block diagram of an example PWM controller, in accordance with the present invention.

Referring now to FIG. 4, shown is a schematic block diagram of an example PWM controller, in accordance with the present invention. PWM controller 104 can include multiple feedback compensation circuits. For example, input current signal $I_{AC}$ obtained by amplifying the difference (e.g., by 20x) between $V_{ACP}$ and $V_{ACN}$ can be provided to a first input terminal of amplifier $G_1$. Also, reference input current signal $I_{AC\_REG}$ can be provided to a second input terminal of amplifier $G_1$, which can generate feedback signal $V_{EA1}$. Charging current signal $I_{CHG}$ can be input to a first input terminal of amplifier $G_2$. Also, reference charging current signal $I_{CHG\_REG2}$ can be input to a second input terminal of amplifier $G_2$, which can generate feedback signal $V_{EA2}$. Battery voltage signal $V_{ISN}$ can be provided to a first input terminal of amplifier $G_3$. Also, reference battery voltage signal $V_{BAT\_REG}$ can be provided to a second input terminal of amplifier $G_3$, which can generate feedback signal $V_{EA3}$.

In this example, the lowest of feedback signal $V_{EA1}$, feedback signal $V_{EA2}$, and feedback signal $V_{EA3}$ selected by diodes $D_{EA1}$, $D_{EA2}$, and $D_{EA3}$ at the output terminals of respective amplifiers $G_1$, $G_2$, and $G_3$ can be compared via comparator CMP3 against a current through main transistor $Q_2$. The current through main transistor $Q_2$ can be obtained based on the voltage drop between ACN and LX, so as to control the duty cycle of power converter 106, and to drive transistors $Q_2$ and $Q_3$ by PWM logic circuit 402 and drivers 404 and 406. During the pre-charging mode, minimum system voltage $V_{SYS\_MIN}$ provided to the second input terminal of amplifier $G_3$ can be configured as the battery voltage. For example, whether to receive minimum system voltage $V_{SYS\_MIN}$ can be determined by mode-switching signal PRE-CHG via a switch, as shown.

Figure 5A:
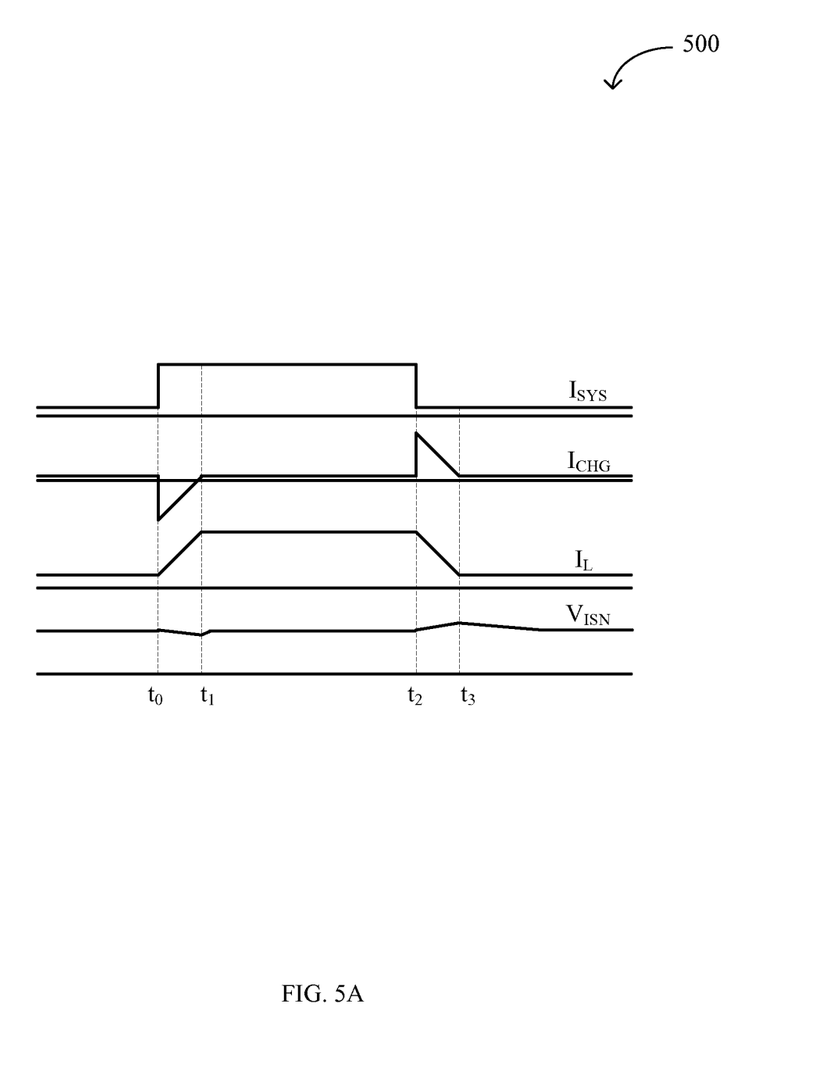
FIG. 5A is a waveform diagram showing a first example operation, in accordance with the present invention.
Figure 5B:
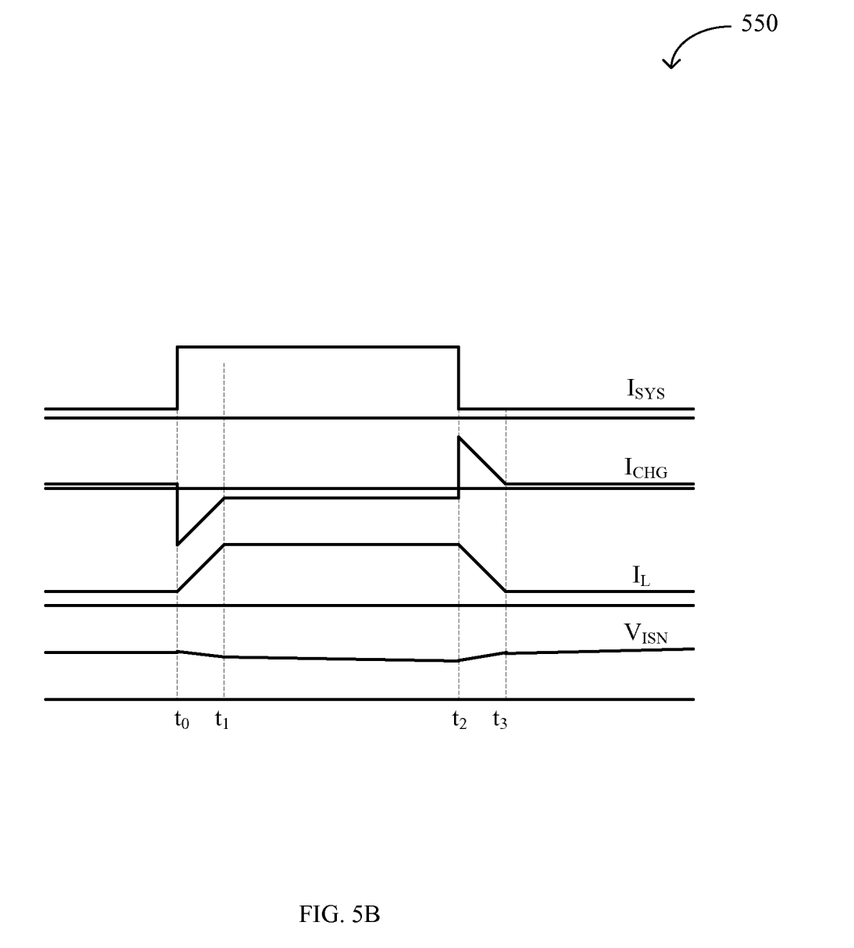
FIG. 5B is a waveform diagram showing a second example operation, in accordance with the present invention.

Referring now to FIGS. 5A and 5B, shown are waveform diagrams of example circuit operation, in accordance with the present invention. At time $t_0$, load current $I_{SYS}$ can suddenly increase, while inductor current $I_L$ may rise more slowly due to the relatively slow loop response. Also, charging current $I_{CHG}$ can quickly be reduced, and may even be a negative value in some cases. The system voltage can be equal to the battery voltage ($V_{SYS}=V_{BAT}$) as transistor $Q_4$ is on. At time $t_1$, inductor current $I_L$ can begin to rise, and charging current $I_{CHG}$ can become normal under a light load condition (as shown in 500), while the battery may be discharged under a heavy load condition (as shown in 550). At time $t_2$, the load can suddenly drop, and inductor current $I_L$ can slowly be reduced, while charging current $I_{CHG}$ can quickly increase. At time $t_3$, the system can return to normal operation. In this way, the adaptor can be protected from being damaged when the system load changes suddenly.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An apparatus, comprising:
 a) a power converter having an output terminal configured to supply power for a load;
 b) a first switch coupled between said power converter and an input voltage;
 c) a second switch coupled between a battery and said output terminal of said power converter;
 d) a pulse-width modulation (PWM) controller configured to control a switching state of a power transistor in said power converter;
 e) a mode-switching circuit configured to select a charging mode or a discharging mode based on a voltage of said battery and a charging current; and
 f) a charging-discharging circuit configured to control said second switch based on said mode selection.

2. The apparatus of claim 1, wherein:
 a) said second switch is fully on to supply power for said load when said input voltage is off-line;
 b) said second switch is fully on to charge said battery when said battery voltage is greater than a minimum system voltage and said input voltage is online; and
 c) said second switch is partially on to charge said battery with limited current in a pre-charging mode when said battery voltage is less than said minimum system voltage.

3. The apparatus of claim 2, wherein when a charging current is less than a minimum charging current during said pre-charging mode, said second switch is fully on to charge with a constant current, and said pre-charging mode is exited.

4. The apparatus of claim 2, wherein said PWM controller comprises:
 a) a first feedback compensation circuit configured to receive an input current signal and a reference input current signal, and to generate a first feedback signal;
 b) a second feedback compensation circuit configured to receive a charging current signal and a reference charging current signal, and to generate a second feedback signal; and
 c) a third feedback compensation circuit configured to receive a battery voltage signal and a reference battery voltage signal, and to generate a third feedback signal, wherein the lowest of said first, second, and third feedback signals is compared against a current through a main power transistor of said power converter, to control a duty cycle signal of said power converter.

5. The apparatus of claim 4, wherein said mode-switching circuit comprises:
 a) a first comparator configured to receive said battery voltage and said minimum system voltage;
 b) a second comparator configured to receive said charging current signal and said minimum charging current; and
 c) a flip flop configured to receive outputs from said first and second comparators, and to generate said mode-switching signal.

6. The apparatus of claim 5, wherein said charging-discharging circuit comprises an amplifier configured to receive said mode-switching signal, said charging current signal, and said pre-charging current signal, and to generate:
 a) a current limit control signal to control said second switch during said pre-charging mode, in order to charge said battery with limited current; and
 b) a driving signal corresponding to said mode-switching signal to control said second switch to fully turn on when out of said pre-charging mode.

7. The apparatus of claim 6, wherein said reference battery voltage signal is configured as said minimum system voltage controlled by said mode-switching signal during said pre-charging mode.

8. A method, comprising:
 a) controlling, by a pulse-width modulation (PWM) controller, a switching state of a power transistor in a power converter, wherein said power converter comprises an output terminal configured to supply power for a load, a first switch is coupled between said power converter and an input voltage, and a second switch is coupled between a battery and said output terminal of said power converter;
 b) selecting, by a mode-switching circuit, a charging mode or a discharging mode based on a voltage of said battery and a charging current; and
 c) controlling, by a charging-discharging circuit, said second switch based on said mode selection.

9. The method of claim 8, wherein said controlling said second switch comprises:
 a) turning said second switch fully on to supply power for said load when said input voltage is off-line;

b) turning said second switch fully on to charge said battery when said battery voltage is greater than a minimum system voltage and said input voltage is online; and c) turning said second switch partially on to charge said battery with limited current in a pre-charging mode when said battery voltage is less than said minimum system voltage.

10. The method of claim 8, wherein:

a) generating, by a first feedback compensation circuit, a first feedback signal based on an input current signal and a reference input current signal;

b) generating, by a second feedback compensation circuit, a second feedback signal based on a charging current signal and a reference charging current signal;

c) generating, by a third feedback compensation circuit, a third feedback signal based on a battery voltage signal and a reference battery voltage signal; and d) controlling a duty cycle signal of said power converter by comparing a lowest of said first, second, and third feedback signals against a current through a main power transistor of said power converter.

11. The method of claim 9, further comprising turning said second switch fully on to charge with a constant current, and exiting said pre-charging mode, when a charging current is less than a minimum charging current during said pre-charging mode.

12. The method of claim 9, further comprising:

a) generating, by said charging-discharging circuit, a current limit control signal to control said second switch during said pre-charging mode, in order to charge said battery with limited current; and b) generating, by said charging-discharging circuit, a driving signal corresponding to said selected mode to fully turn on said second switch when out of said pre-charging mode.

\* \* \* \* \*